US012296497B2

(12) United States Patent
Pocino et al.

(10) Patent No.: US 12,296,497 B2
(45) Date of Patent: May 13, 2025

(54) RAZOR BLADE SNAPPER CLEANING DEVICE

(71) Applicants: Ralph E. Pocino, Mercerville, NJ (US); Armando R. Pocino, Mercerville, NJ (US)

(72) Inventors: Ralph E. Pocino, Mercerville, NJ (US); Armando R. Pocino, Mercerville, NJ (US)

( * ) Notice: Subject to any disclaimer, the term of this patent is extended or adjusted under 35 U.S.C. 154(b) by 76 days.

(21) Appl. No.: 17/803,456

(22) Filed: Jul. 20, 2022

(65) Prior Publication Data

US 2024/0025064 A1 Jan. 25, 2024

(51) Int. Cl.
*B26B 21/40* (2006.01)

(52) U.S. Cl.
CPC .................................... *B26B 21/40* (2013.01)

(58) Field of Classification Search
CPC ...................................................... B26B 21/40
USPC ............................................................. 30/41
See application file for complete search history.

(56) References Cited

U.S. PATENT DOCUMENTS 2,715,267 A 8/1955 Force
3,283,403 A * 11/1966 Chambers .............. B26B 21/32 30/526
3,972,114 A 8/1976 Chao et al.
4,047,296 A 9/1977 Ishida et al.
D255,163 S 5/1980 Chen
4,205,437 A 6/1980 Chen et al.
4,344,227 A 8/1982 Chen et al.
6,026,578 A * 2/2000 Brenner ................ B26B 21/523 30/526
2023/0256635 A1 * 8/2023 Glover ................ B26B 21/4062 30/41

* cited by examiner

*Primary Examiner* — Nhat Chieu Q Do

(74) *Attorney, Agent, or Firm* — Wilkinson Law Office; Clinton H. Wilkinson

(57) ABSTRACT

A razor snapper device for removing cut hair and shaving debris from a razor by spring-loaded impact and configured to couple to a handle of the razor, including a snapper device housing, a pull mechanism positioned within said housing configured for manual pulling and release actions and including a pull rod having a pull handle at a proximal end of the pull rod and a striker at a distal end of the pull rod, a strike plate located opposite the striker, and a spring positioned to bias the pull mechanism toward the strike plate and having sufficient tension to create an impact of the striker against the strike plate when the proximal end of the pull mechanism is pulled outwardly of the razor snapper device housing and released which causes cut hair and shaving debris to release from the razor.

10 Claims, 7 Drawing Sheets

RAZOR BLADE SNAPPER CLEANING DEVICE

BACKGROUND OF INVENTION a. Field of Invention

The invention relates generally to the problem of manual razors (electric razors excluded) that inherently clog up with cut hair and other shaving debris ("debris" may be water, shaving cream, dried shaved skin, razor lubricant, combinations thereof, etc.). The problem persists for both single blade razors and multi-blade razors. Users of manual razors typically repeatedly bang the razor against a sink, or tile or countertop or palm, with possible damage to the razor and/or to the item receiving the bang. In addition, there is not much control over where the cut hair and debris end up (in the sink, dripping down the razor, on the counter, on the tile or combinations thereof). The present invention is directed to devices that are dedicated to the removal of cut hair and debris, with significant advantages—preventing damage to the razor, preventing damage to the prior recipient item of the banging, control over the location of the effort to remove the cut hair and debris, such as over running water or a sink or a basket. Thus, the invention is a pull and release device that causes a controlled bang (impact/vibration) that loosens and releases the lodged cut hair and debris. The invention includes a pull mechanism and a spring. The spring biases the pull mechanism against a surface (of the razor or a strike plate) and when the pull mechanism is pulled and released, the impact of it against the receiving surface causes a shaking that releases the cut hair and debris. The present invention device may be partially or completely unistructurally formed with the razor or may be a separate item. When a separate item, it is most favorably designed for repeated use, i.e., removable from one razor and attachable to a second razor, such as when the first is spent (ready for disposal). Because the present invention is pulled back and released (snapped), it is designated herein as a razor snapper device.

b. Description of Related Art

The following patents are representative of the field pertaining to the present invention:

U.S. Pat. No. 4,344,227 to Chen et al. describes an improved twin blade razor system having a unitary member positioned between the pair of blades for both spacing the blades and ejecting shaving debris from that space. The unitary member, which may conveniently be of injection molded plastic, includes a spacer portion, an ejector portion, and biasing apparatus connecting the ejector portion and the spacer portion for biasing the ejector portion to a normally retracted position relative to the blades and spacer. The ejector portion is manually displaceable to an advanced ejecting position. The biasing portion may be one or more beam springs connected and configured to reduce distortion and/or stressing of the relatively moving portions of the member during actuation. This device relies upon ejection, that is, pushing the cut hair out of its lodged position and is necessarily not transferable to a second razor.

U.S. Pat. No. 4,205,437 Chen et al. describes an improved twin blade razor system having a unitary member positioned between the pair of blades for both spacing the blades and ejecting shaving debris from that space. The unitary member, which may conveniently be of injection molded plastic, includes a spacer portion, an ejector portion, and biasing means connecting the ejector portion and the spacer portion for biasing the ejector portion to a normally retracted position relative to the blades and spacer. The ejector portion extends across in front of but is substantially discontinuous behind the spacer portion, resulting in a compact front-to-rear configuration for the unitary member which may be housed in a relatively compact twin blade system. The ejector portion is manually displaceable to an advanced ejecting position. The biasing portion may be one or more beam springs connected and configured to reduce distortion and/or stressing of the relatively moving portions of the member during actuation. This device relies upon ejection, that is, pushing the cut hair out of its lodged position and is necessarily not transferable to a second razor.

U.S. Pat. No. 4,047,296 to Ishida et al. describes a two-edge shaving blade unit having a member for ejecting shaved hair particles and other matter deposited in and clogging a space between the leading and following cutting edges. The upper and lower blade elements are fixed between a platform and a cap portion in a parallel and spaced relation with a spacer interposed there between. The ejecting member is retained between the upper and lower blade elements and is loosely fitted around the spacer in a manner displaceable between advanced and retracted positions. The cap portion has a resilient rear wall having a knob at its laterally intermediate portion, and to this knob is connected the ejecting member. The ejecting member can be displaced forwardly into the advanced position when the knob is pushed manually so as to eject the hair particles and other matter deposited in and clogging the space between the leading and following cutting edges. Further, when the pushing force on the knob is removed, the knob and thus the ejecting member are displaced to the original retracted position with the resilient force of the resilient rear wall. This device relies upon ejection, that is, pushing the cut hair out of its lodged position and is necessarily not transferable to a second razor.

U.S. Pat. No. 3,972,114 to Chao et al. describes a self-cleaning mechanism arranged between the blades of a twin blade razor, whereby after use, the area between the blades which fill with human hair and soap, can be made clean and free of debris by the movement of the cleaning mechanism with a person's fingers.

U.S. Pat. No. 2,715,267 to G. E. Force describes a safety razor assembly with components that include blade clamping elements that can permit changing of blades by opening and closing of various elements of a loading magazine.

U.S. Design Pat. No. Des. 255, 163 to Chen describes a safety razor cartridge with clean-out device. It appears as a press button device (that perhaps pushes the cut hair out), and not a pull and release snapping device, as in the present invention.

Notwithstanding the prior art, the present invention is neither taught nor rendered obvious thereby.

SUMMARY OF INVENTION

The present invention is directed to a razor and a device for rapid, manual removal of cut hair and shaving debris from a manual (non-electric) razor. Thus, the present invention device is such a device that relies upon a controlled impact strike against the razor. The present invention is a manual razor and a razor snapper device for removing cut hair and shaving debris from the razor by spring-loaded impact against the handle potion of the razor.

The present invention includes a razor having a handle and having a razor housing, and the razor snapper device connected to the handle.

In some embodiments, the present invention razor snapper includes: a pull mechanism for manual pull and release action; and, at least one spring connected to, or a part of, the pull mechanism. The pull mechanism is elongated and may be flat or round or otherwise shaped in its cross section. The (at least one) spring is positioned on the razor to bias the pull mechanism toward the razor, the spring having sufficient tension to create an impact against the razor when the pull mechanism is pulled away from the razor and released, to thereby cause cut hair and shaving debris to release from the razor.

In some embodiments, the razor snapper device pull mechanism is fixedly attached to the razor. In other embodiments, it is removably attached to the handle. In some of these embodiments, the pull mechanism is removably attachable to the razor with at least one attachment component on the pull mechanism for attachment thereof to the razor. This attachment component may be selected from the group consisting of a rigid yoke, a flexible yoke, a clip, a latch and a rubber band. In some embodiments, there are two or more attachment components.

In some embodiments, the pull mechanism includes a living spring section that constitutes the spring. In other words, the pull mechanism may be springy and be attached to a handle, and the pull mechanism itself is also the spring, or a portion of the pull mechanism is the spring.

In some embodiments, the spring is also the attachment component, such as a flexible yoke or a rubber band, or sets of flexible yokes or rubber bands.

In some embodiments, the present invention razor snapper takes the form of a plunger-like device. Thus, the razor snapper device for removing cut hair and shaving debris from a razor by spring-loaded impact, the razor having a handle and having a razor-receiving member connected to the handle, includes: a.) a razor snapper device housing; b.) a pull mechanism for manual pull and release action, the pull mechanism positioned within the housing, the pull mechanism including a pull rod with a proximal end and a distal end, and a striker at the distal end of the pull rod; c.) a strike plate located opposite the striker; and, d.) a spring connected to the pull mechanism, the spring positioned within the housing, and the spring positioned to bias the pull mechanism toward the strike plate, the spring having sufficient tension to create an impact against the strike plate when the pull mechanism is pulled away from the strike plate and released, to thereby cause cut hair and shaving debris to release from the razor. In these embodiments, when the handle is hollow, the snapper device may be inside the hollow handle, partially inside the hollow handle, or on the outside of the hollow handle. When the handle is not hollow, the snapper is removably or fixedly attached to the outside of the handle. Therefore, in some embodiments, when the handle is a hollow handle and at least a portion of the handle is the razor snapper device housing, the pull mechanism, striker, and spring are positioned within the handle. In some of these, the hollow handle has an open top and a closed bottom and the closed bottom is the strike plate. Also, the razor snapper device pull mechanism may be removably attachable to the razor and at least one attachment component may be included on the housing for attachment thereof to the razor.

In a preferred embodiment, the razor snapper device attachment components are rubber bands that also perform as springs and the pull mechanism is an elongated, flat or elongated, arched pull mechanism.

Additional features, advantages, and embodiments of the invention may be set forth, included or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

In FIG. 8, the pull mechanism/spring is gripped by a user; in FIG. 9, the pull mechanism is pulled up so that it is tensed and the striker end is ready for release; in FIG. 10, the pull mechanism has been released, the striker has impacted on the razor, and the cut hair and other shaving debris are released; view thereof;

DETAILED DESCRIPTION OF THE EMBODIMENTS

Figure 1:
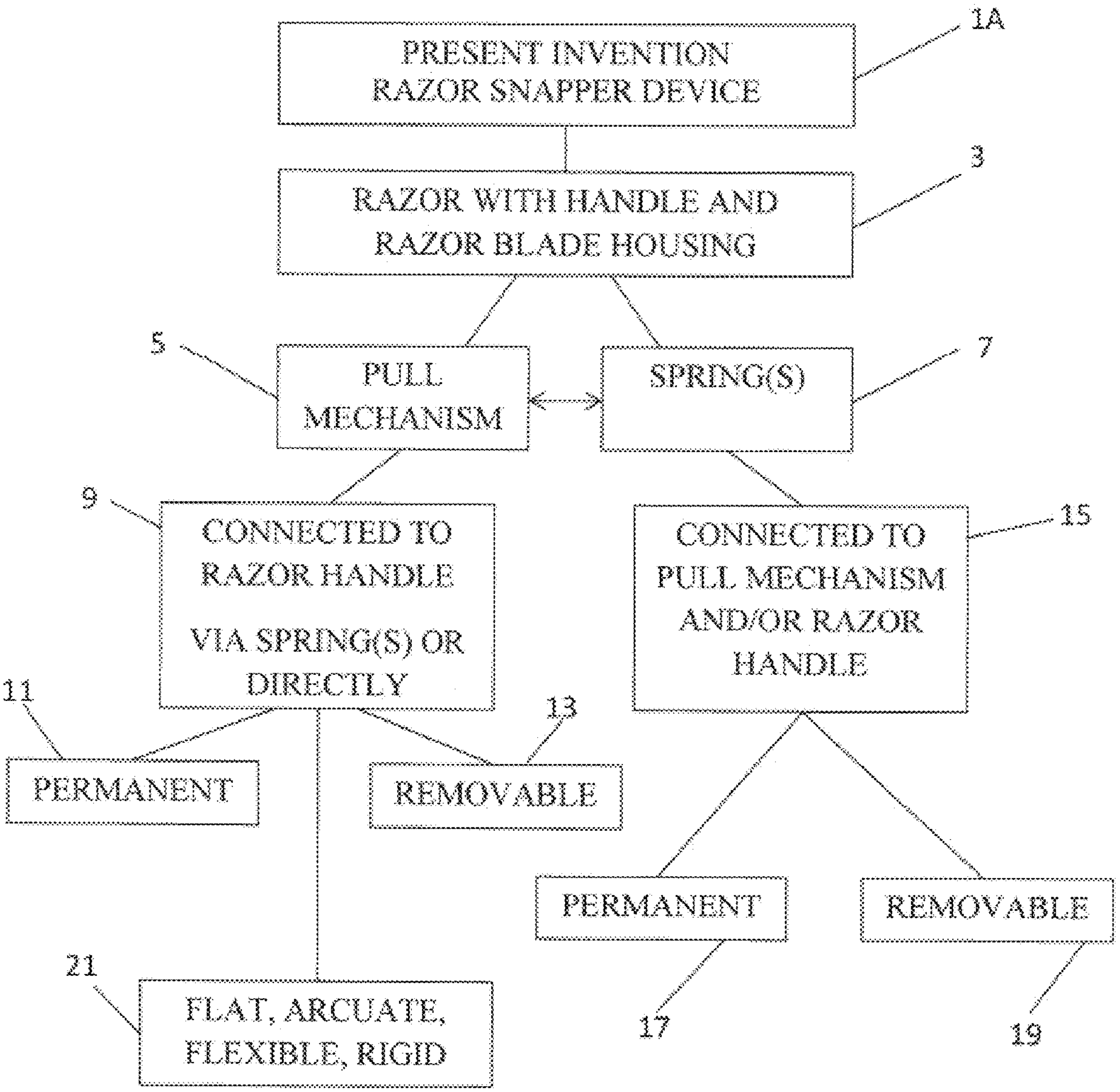
FIG. 1 is a block diagram illustrating some of the features of the present invention devices.

Referring now in detail to the drawings wherein like reference numerals designate corresponding parts throughout the several views, various embodiments of the present invention are shown.

FIG. 1 is a block diagram illustrating some of the features of the present invention device 1A. This includes a razor with a handle and razor blade housing, block 3, and a pull mechanism, block 5, with one or more springs, block 7. The pull mechanism is connected to the razor handle via the springs or directly connected to the handle, block 9. When the pull mechanism is connected to the handle with one or more springs, it may be permanently attached, block 11, or removably attached, block 13. Likewise, when the pull mechanism is connected to the handle directly, it may be permanently attached, block 11, or removably attached, block 13. When it is permanently attached, it may be unistructurally molded with a razor handle or subsequently attached to it, e.g., by heat welding, one-way insertion pegs, or otherwise. The pull mechanism may be flat, arcuate, or have other shapes and may be flexible or rigid, block 21. The one or more springs, block 7, may be connected to the pull mechanism (or even an integral part of the pull mechanism) or may be connected to the razor handle or both the pull mechanism and the razor handle, block 15. These connections may be permanent, block 17, or removable, block 19. When the user pulls on the pull mechanism and releases, the spring snaps the pull mechanism against the surface to cause cut hairs and shaving debris to be released from the razor.

Figure 2:
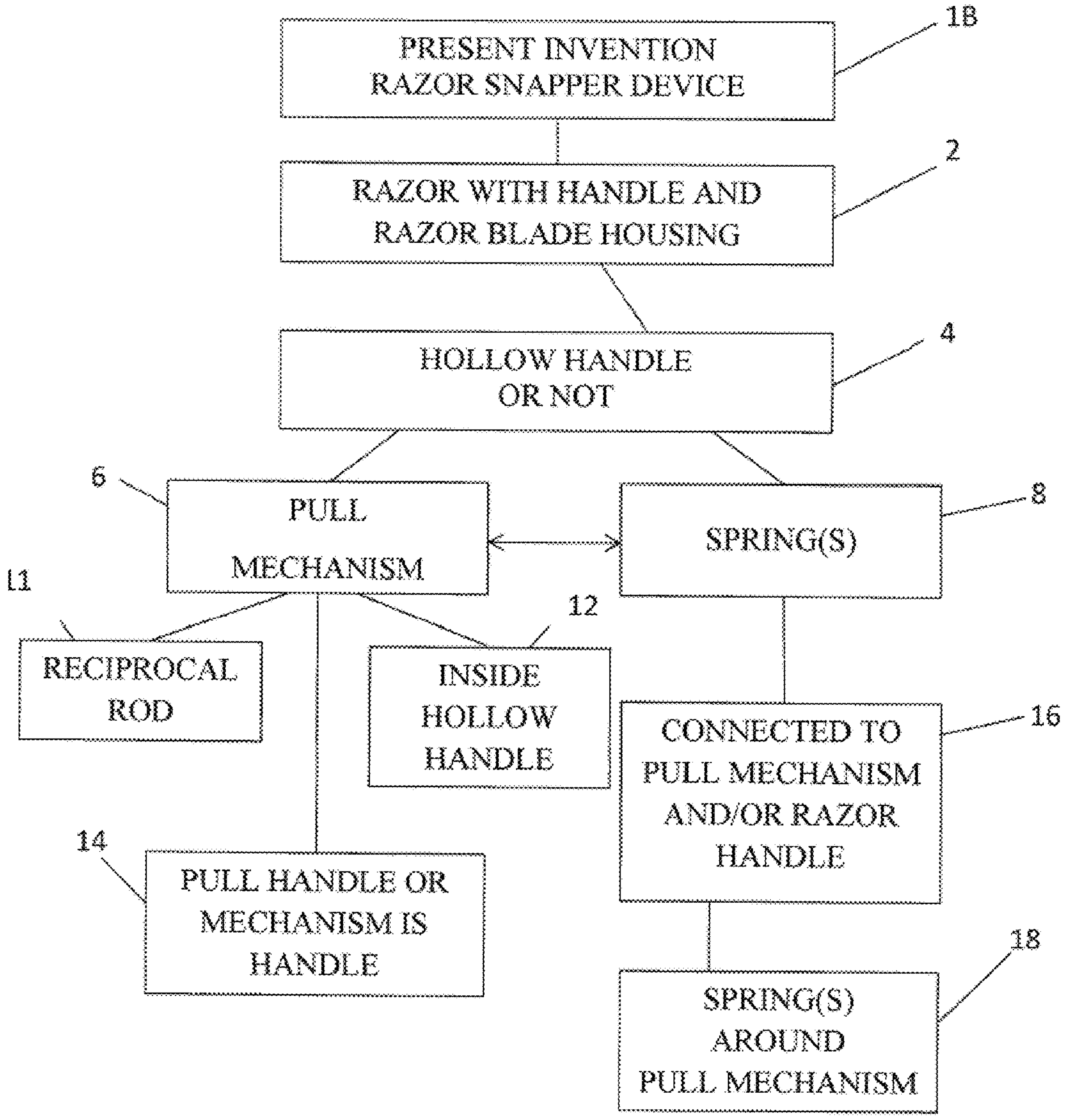
FIG. 2 shows a block diagram illustrating some other features and embodiments of the present invention devices.

FIG. 2 shows a block diagram illustrating some other features and embodiments of the present invention device 1B. These present invention razor snapper devices of FIG. 2 represent alternative embodiments. Thus, there is a razor with a handle and razor blade housing, block 2, but the handle may be hollow, or not, block 4. If it is hollow, then the snapper component may be within the hollow handle or not. In these embodiments, the pull mechanism, block 6, may be a reciprocal rod, block 11, with one or more springs, block 8, connected to the pull mechanism or the razor handle or both, block 16, and the one or more springs may be coiled around the pull mechanism, block 18. When a reciprocal rod, block 11, is used for the pull mechanism, the springs are coiled around it and pushes the rod so that it or a striker at the end of it is pressed against a surface. As shown in block 14, there may be a pull handle on the pull mechanism or the pull mechanism itself may also act as a handle. When the user pulls on the pull mechanism and releases, the spring snaps the pull mechanism against the surface to cause cut hairs and shaving debris to be released from the razor.

Figure 3:
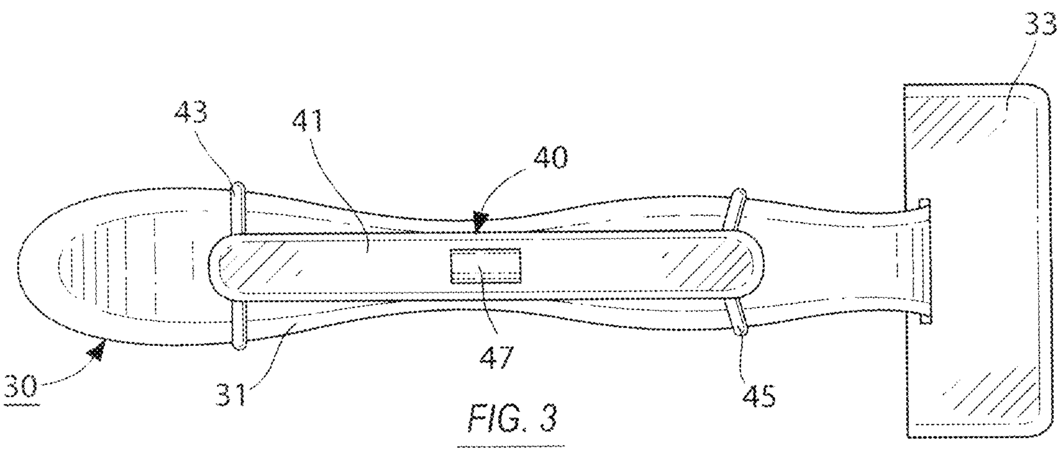
FIG. 3 is a top view of a present invention razor and razor snapper device.
Figure 4:
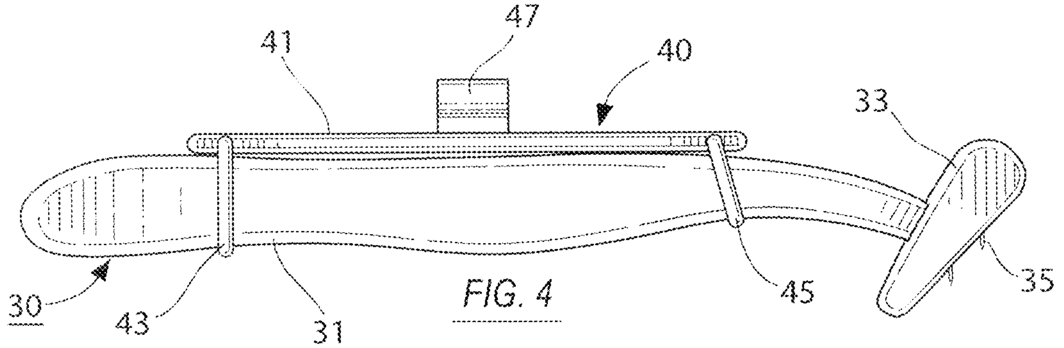
FIG. 4 is a side view of the present invention razor and snapper device shown in FIG. 3 above.

FIG. 3 is a top view of a present invention razor 30 and razor snapper 40. FIG. 4 is a side view of the present invention razor 30 and snapper device 40 shown in FIG. 3 above, with identical components being identically numbered. Razor 30 is a disposable or non-disposable razor that may have detachable or non-detachable razor housing or razor blades. As shown, it has a handle 31, a razor housing 33, and replaceable dual blades 35. Razor snapper 40 includes pull mechanism 41 with springs (custom sized, thick, stretchable elastic bands) 43 and 45. Pull mechanism 41 has an optional pull handle 47 on its top, as shown.

Figure 5:
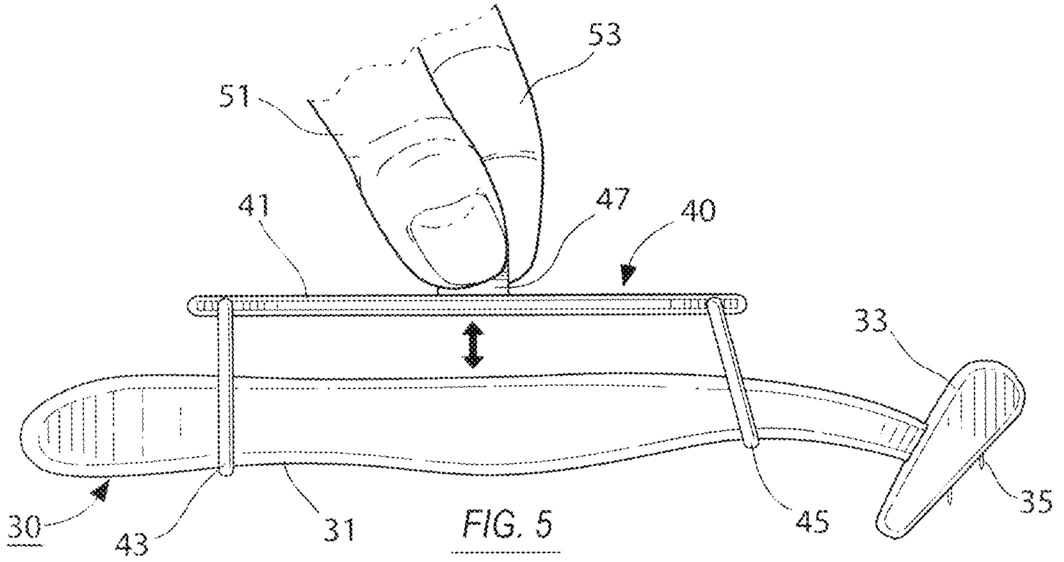
FIG. 5 shows a side view of the present invention device shown in FIGS. 3 and 4, except that this Figure shows the device in use, being pulled away from the razor (firing position) about to be released for impact.

FIG. 5 shows a side view of the present invention razor 30 shown in FIGS. 3 and 4, except that this Figure shows the device in use, with the razor snapper 40 attached to razor 30 using springs or elastic 43 and 45, being pulled away from the razor 30 with fingers 51 and 53 using the pull mechanism handle 47 attached to the pull mechanism 41 about to be released for impact. This can be referred to as the "firing position."

Figure 6:
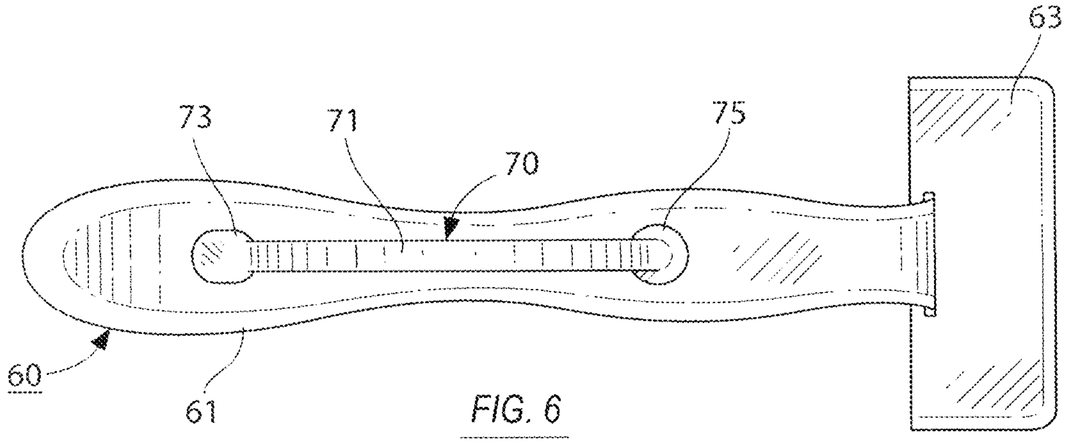
FIG. 6 and FIG. 7, respectively, show top and side views of an alternative present invention device wherein the pull mechanism is permanently attached to the razor and the pull mechanism is a living spring and thus functions, at least in part, as the spring.
Figure 7:
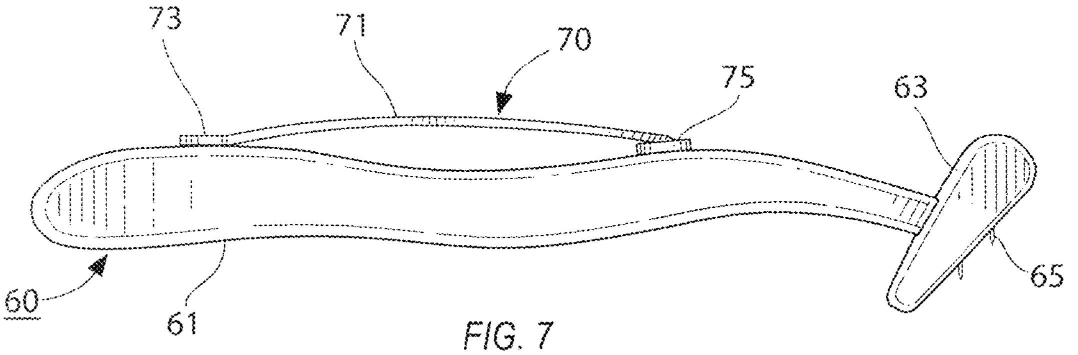

FIG. 6 and FIG. 7, respectively, show top and side views of an alternative present invention device that includes razor 60 and snapper 70. Razor 60 includes a handle 61 with a blade assembly 63 and blades 65. The snapper pull mechanism 71 is permanently attached to the razor handle 61, at the attachment anchor 73. The pull mechanism 71 is a living spring and thus functions, at least in part, as the spring as well as the pull mechanism. There is a striker 75 at the distal end of pull mechanism 71. Striker 75 is biased so as to press on handle 61. As shown in sequence in FIGS. 8, 9 and 10, thumb 81 and finger 83 grasp snapper 70 in the middle of pull mechanism 71 (FIG. 8), striker 75 is pulled away from handle 61 (FIG. 9) and released to snap back to strike handle 61 (FIG. 10) to cause shaved hairs and shaving debris 67 to release and fall.

Figure 8:
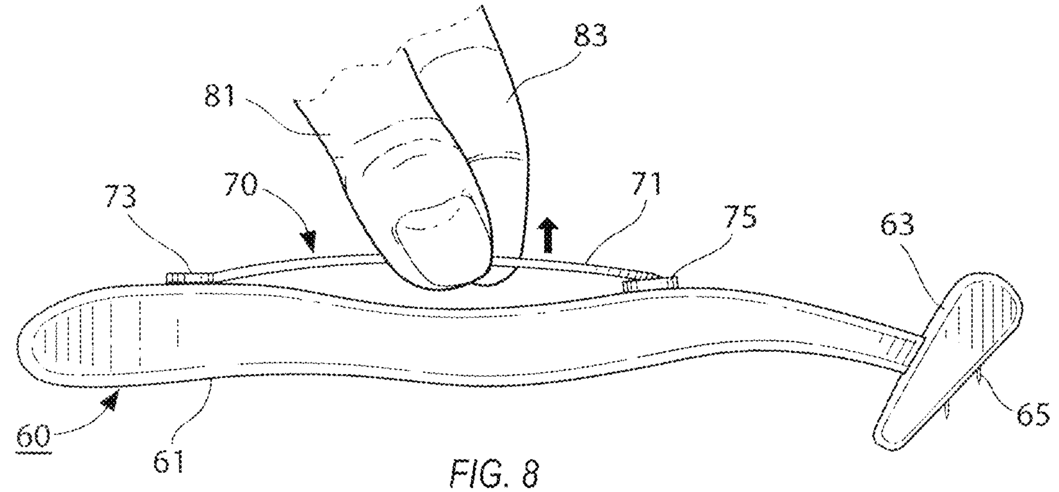
FIGS. 8, 9 and 10 show the aforementioned FIG. 6 and present invention device in use.
Figure 9:
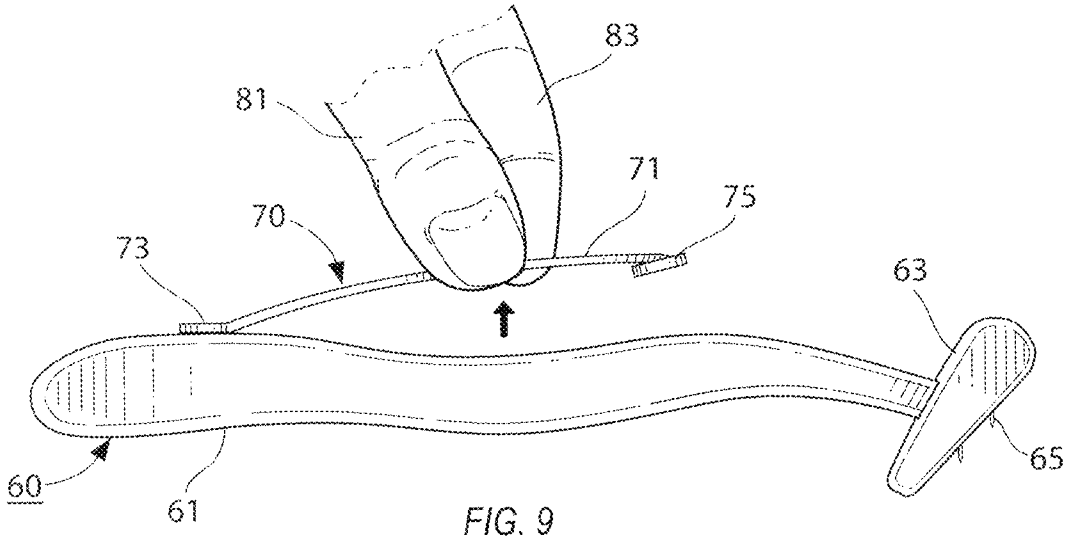
Figure 10:
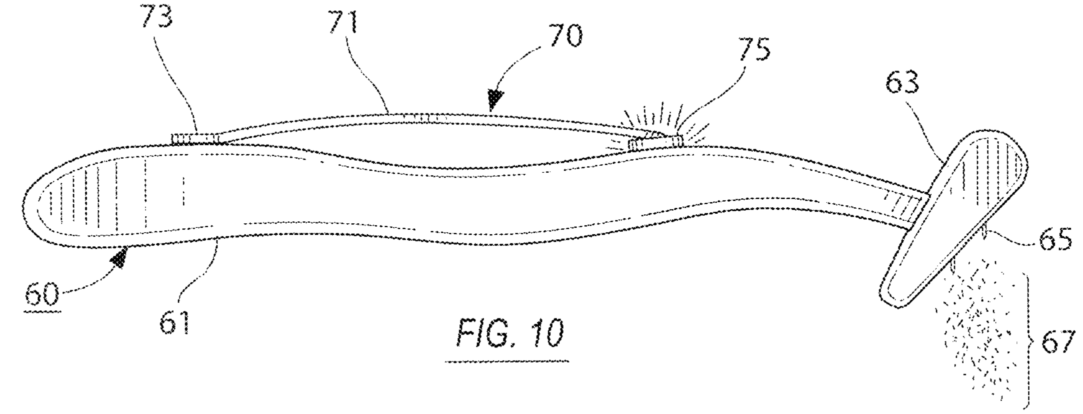

To reiterate, the present invention involves a portion of the device (the pull mechanism) pressed against the handle of the razor; it is subsequently pulled and released to strike the handle in a way to shake lose the cut hairs and shaving debris that might otherwise remain and reduce or inhibit the efficiency of the razor. Thus, as mentioned, FIGS. 8, 9 and 10 show the aforementioned FIGS. 6 and 7 present invention device in use. In FIG. 8, the pull mechanism/spring is gripped by a user; in FIG. 9, the pull mechanism is pulled up so that it is tensed and the striker is ready for release; in FIG. 10, the pull mechanism has been released, the striker has impacted on the razor, and the cut hair and other shaving debris are released. The striker may be the center of the pull mechanism, the distal end of the pull handle or the proximal end of the pull handle.

Figure 11:
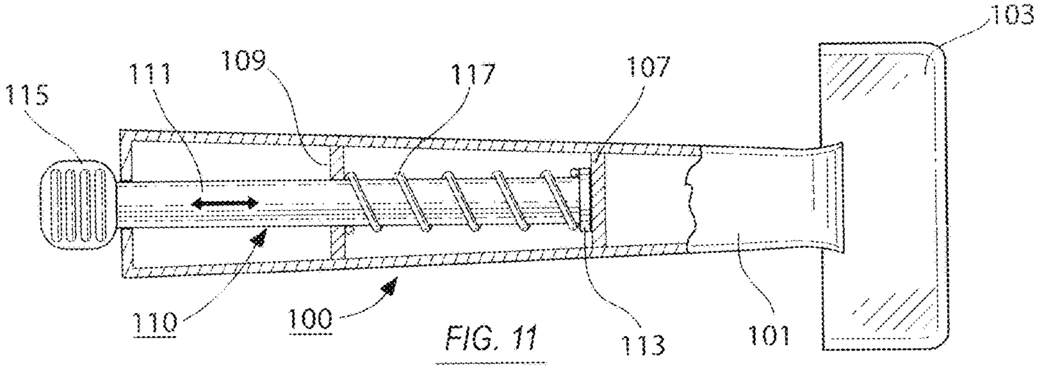
FIGS. 11, 12 and 13 illustrate a present invention embodiment in which the razor snapper is built into the hollow handle of the razor.
Figure 12:
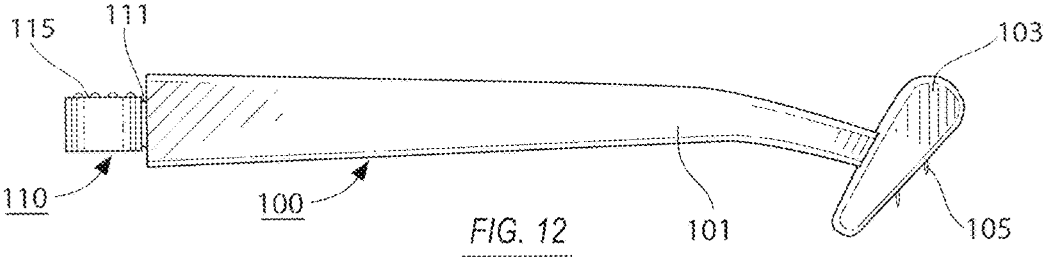
Figure 13:
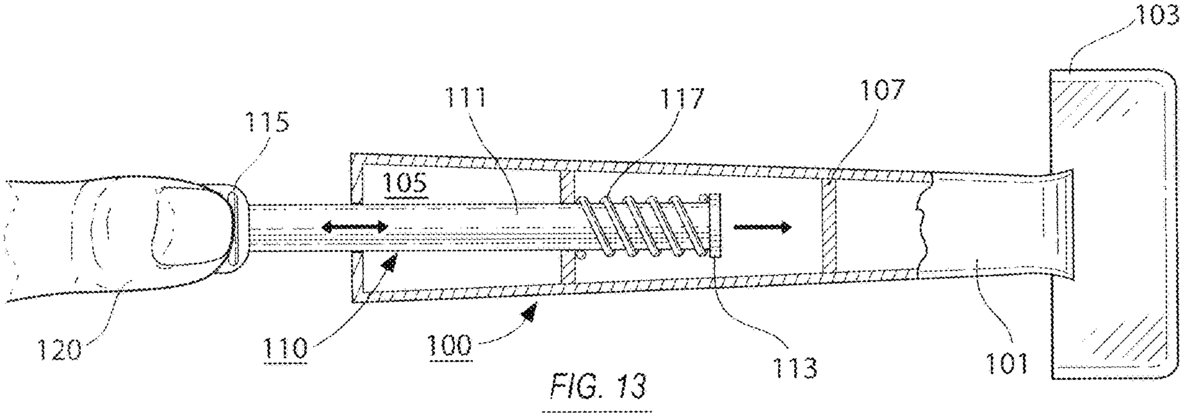

FIGS. 11, 12 and 13 illustrate a present invention embodiment in which the razor snapper is built into the hollow handle of the razor. Specifically, FIG. 11 shows a partial, cut top view; FIG. 12 shows a full side view and FIG. 13 shows a-top partially cut view with the present invention device in the firing position. All components in each of these figures that are identical are identically numbered. Razor 100 includes a hollow handle 101, a blade housing 103 and blades 105. Located within hollow handle 101 is strike plate 107. Razor snapper 110 includes piston rod 111, striker 113 and pull handle 115. There is a coil spring 117 wrapped around piston rod 111 and pressed against stop 109. This biases striker 113 against strike plate 107 when not in use. A user's thumb 120 and finger behind it (not shown) squeeze and pull handle 115. This loads or coils spring 117 as shown. When the user lets go, spring 117 pushes striker 113 against strike plate 107 to cause a "snap" of the razor 100 such that cut hairs and debris are released.

Figure 14:
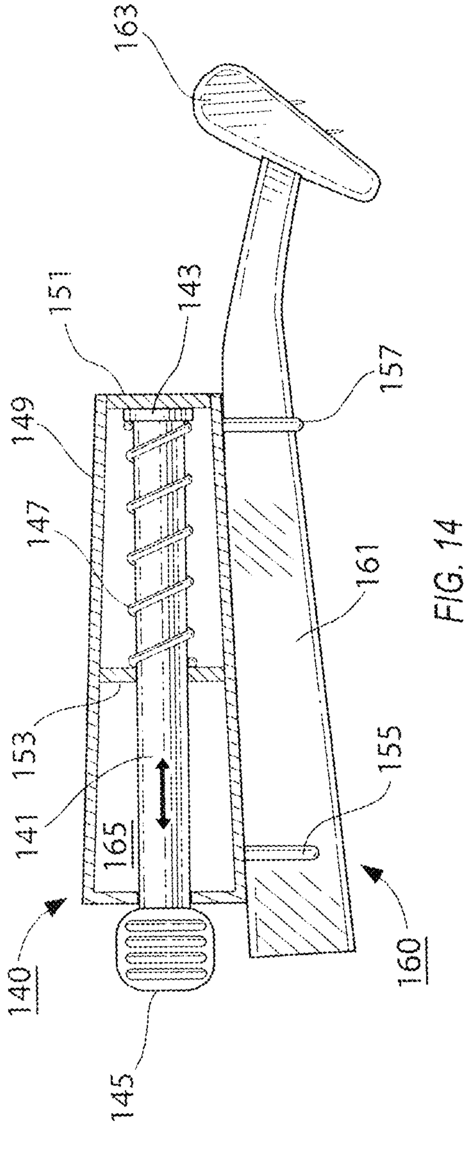
FIG. 14 shows yet another present invention embodiment wherein the snapper is included in a mounted housing atop the razor, being removable and mounted with a clip and a flexible yoke.
Figure 15:
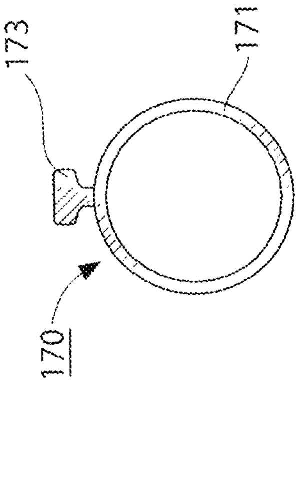
FIGS. 15 and 16 show an end view and a side view of a present invention snapper removably attached to a razor.

FIG. 14 shows yet another present invention embodiment wherein the snapper is a stand-alone, attachable/detachable device adapted for mounting on a razor. Specifically, this device operates in the same fashion as the one shown in the hollow handle in the immediately prior Figures, except that this is removable and on the outside of the handle. Thus, FIG. 14 shows razor 160 with handle 161 and razor housing 163 with blades, and has the snapper 140 attached atop the razor 160, being removable and mounted with a clip 155 and a flexible yoke 157. Snapper 140 has its own housing 149, which includes hollow area 165, spring stop 153 and bottom strike plate 151. The pull mechanism 141 is a moveable piston with a pull handle 145 and a striker 143. Spring 147 braces against stop 153 and pushes pull mechanism 141 so that striker 143 is pushed against bottom strike plate 151. When a user's thumb and finger behind it (not shown) squeeze and pull handle 145, this loads or coils spring 147. When the user lets go, spring 147 pushes striker 143 against strike plate 151 to cause a "snap" of the razor 160. This snap tremor is hard enough such that cut hairs and debris are released from razor 160; FIG. 15 shows an end view of a present invention snapper component that includes a wide, flexible band and a pull mechanism, and FIG. 16 shows a side view of a present invention razor and snapper, featuring the same snapper shown in FIG. 15.

Figure 16:
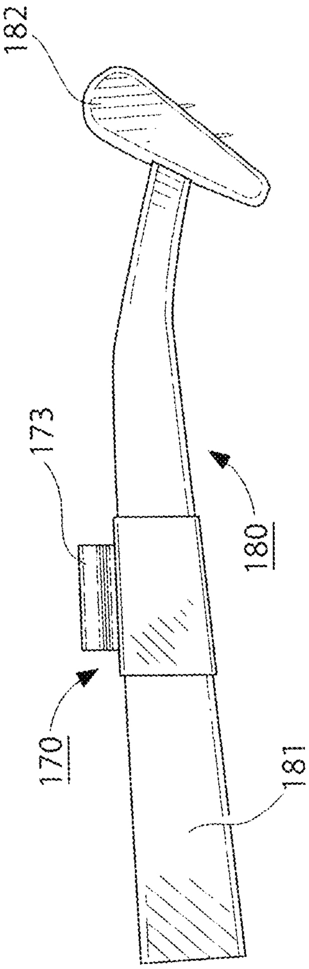

FIGS. 15 and 16 are discussed here collectively, wherein like parts are like numbered. In FIG. 15, stand-alone present invention snapper 170 is shown in an end view and constitutes a flexible wide elastic band 171 and a pull mechanism 173. This snapper 170 is shown in its side view and is removably attached to razor 180. As with all of the present invention devices described herein, the user holds the razor, e.g., over a sink or waste basket, pulls on the pull mechanism, thereby stretching the spring component, e.g., elastic band, and then releases to create an impact against the razor and to thereby release debris. In these figures, razor 180 includes handle 181 and razor blade assembly 182. Snapper 170 includes elongated stretchable band 171 and pull handle 173. Elongated stretchable band 171 functions as both a spring and an attachment mechanism. When the user holds razor 180 with one hand and pulls and releases pull handle 173 with the other hand, the impact of pull handle 173 and band 171 causes sufficient vibration on razor 180 to release undesirable debris.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A razor snapper device for removing cut hair and shaving debris from a razor by spring-loaded impact, said razor having a handle and a razor blade housing or a cartridge connected to said handle, said razor snapper device configured to be coupled to said handle of said razor and wherein said razor snapper device comprises:

a. a razor snapper device housing;

b. a pull mechanism for manual pulling and release actions, said pull mechanism positioned within said snapper device housing, said pull mechanism including a pull rod with a proximal end and a distal end, a pull handle at said proximal end of said pull rod, and a striker at said distal end of said pull rod;

c. a strike plate located opposite said striker; and, d. a spring connected to said pull mechanism, said spring positioned within said snapper device housing, and said spring positioned to bias said pull mechanism toward said strike plate, said spring having sufficient tension to create an impact of said striker against said strike plate when said pull mechanism is pulled in an outward direction of said snapper device housing by said pull handle, and said striker is pulled away from said strike plate and released, said impact causing cut hair and shaving debris to release from said razor.

2. The razor snapper device of claim 1, wherein said razor snapper device housing is fixedly attached to said razor.

3. The razor snapper device of claim 1, wherein said razor snapper device housing is removably attached to said razor.

4. The razor snapper device of claim 1, wherein said handle is a hollow handle and at least a portion of said handle is said razor snapper device housing, said pull mechanism, striker, and spring are positioned within said handle.

5. The razor snapper device of claim 4, wherein said hollow handle has an open top and a closed bottom and said closed bottom is the strike plate.

6. The razor snapper device of claim 1, wherein said pull mechanism is removably attachable to said razor and includes at least one attachment component on said housing for attachment thereof to said razor.

7. The razor snapper device of claim 6, wherein said attachment component is selected from the group consisting of a rigid yoke, a flexible yoke, a clip, a latch and a rubber band.

8. The razor snapper device of claim 6, wherein there are two attachment components.

9. The razor snapper device of claim 8, wherein said attachment components are selected from the group consisting of a rigid yoke, a flexible yoke, a clip, a latch and a rubber band.

10. The razor snapper device of claim 9, wherein said attachment components are rubber bands and said pull mechanism is an elongated arched pull mechanism.

* * * * *